Feb. 1, 1966
W. W. DRUMMOND
3,232,730
METHOD AND APPARATUS FOR PRODUCING FIBERS
Original Filed Nov. 14, 1960
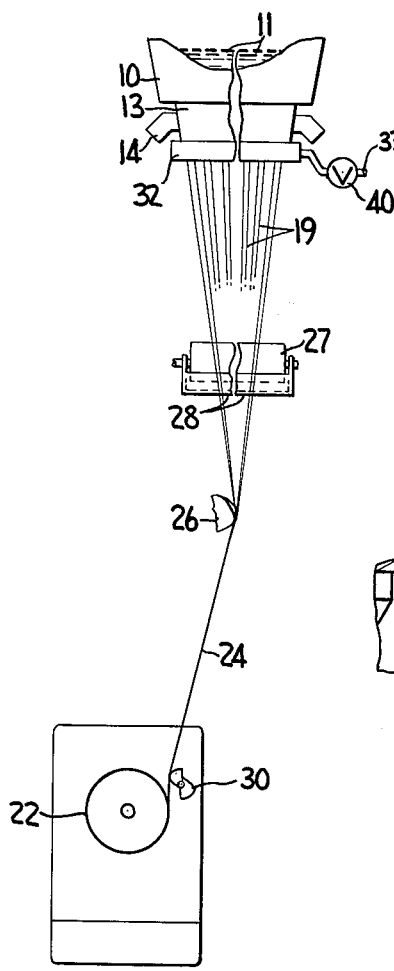
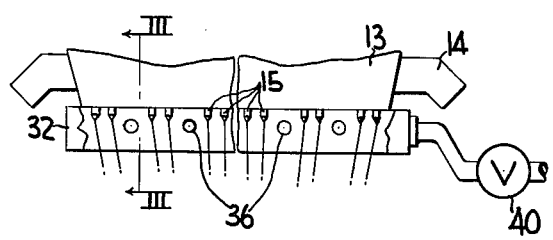
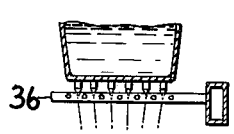
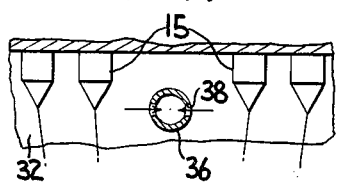
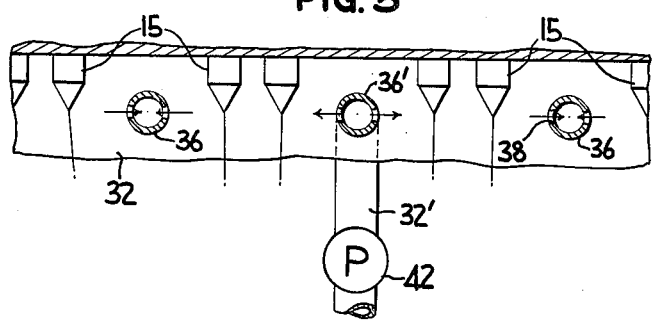
INVENTOR.
WARREN W. DRUMMOND
BY
Oscar L. Spencer
ATTORNEY 3,232,730
METHOD AND APPARATUS FOR
PRODUCING FIBERS
Warren W. Drummond, Allison Park, Pa., assignor to Pittsburgh Plate Glass Company, Pittsburgh, Pa., a corporation of Pennsylvania
Original application Nov. 14, 1960, Ser. No. 68,860. Divided and this application Sept. 7, 1962, Ser. No. 222.101
5 Claims. (Cl. 65—2)

This application is a division of my copending application, Serial No. 68,860, filed November 14, 1960, now abandoned, entitled, "Method and Apparatus for Producing Fibers."

The present invention relates to a method for producing thermoplastic, continuous filament fibers and it has particular relation to a method for producing continuous filament glass fibers.

Continuous filament glass fibers have been produced according to the process shown in United States Patent No. 2,291,289. In this process, molten glass is contained in a platinum alloy, trough-like chamber known as a bushing. The bushing is electrically heated by passing electric current through it and the glass is heated by contact with the hot bushing. The bushing contains a plurality of orifices in its bottom with cylindrical, hollow tips projecting downwardly from the bottom of the bushing in line with the orifices to deliver the glass. The glass is pulled from the tips into fine, continuous filaments by suitable means such as a winder. The filaments are passed over a gathering guide and grouped into a strand before being collected on the winder.

The critical point in the fiber forming process is where the fibers are pulled from the bushing tips and stretched out exceedingly rapidly to form the very fine filaments. The molten glass forms as an inverted cone hanging from the bushing tip, and the filament is pulled from the apex of the cone at a rate of about 2 to 3 miles per minute. The diameter of the cone of glass at its base is of the order of 0.075 inch, and the diameter of the filaments pulled from the cone is of the order of 5 to 20 microns. It is calculated that the acceleration of the glass as it passes from the base of the cone to the apex of the cone and away therefrom is somewhere in the neighborhood of 240,000 G's within a fraction of a second and within the space of a fraction of an inch.

In order to accomplish this, it has been found to be necessary to control the temperature of the glass in the cone and adjacent to it very carefully. The glass is heated in the bushing to a temperature at which it is quite fluid in order to insure that the glass is in a highly refined state. At this temperature it is much too fluid for fiber forming and it must be cooled by the time it reaches the cones so that it is viscous enough for fiber forming. Some cooling is accomplished as the glass passes through the bushing tips and the glass is cooled to fiber drawing temperature as it is exposed to the atmosphere while suspended in the cone.

Accelerated cooling of the glass in the cone has been accomplished by directing a continuous flow of cool air against the cones and bushing tips as shown in the above-mentioned patent. This is satisfactory when there are only two rows of tips. The glass fiber art has now moved to the point where there are 200, 400 and even 600 orifices and tips in a single bushing, and this has necessitated that the tips be arranged in more than two rows, for example, from 4 to 20 or more parallel rows of tips extending in the long dimension of the bushing and having 30 to 50 or more tips in each row. The prior method of cooling by directing air against the tips and cones is not satisfactory for continuous fiber forming with this many rows of tips and cones. The outside rows of tips and cones are cooled more than the inside rows, and the uneven cooling results in erratic performance of the fiber forming process.

It is an object of this invention to provide an improved method of forming continuous, thermoplastic filaments, particularly strands of multi-filament glass fibers, where the filaments are drawn from a bushing having more than two longitudinal rows of orifices, for example, 4 to 20 or more longitudinal rows of orifices. It is a further object of the invention to provide an improved method of stabilizing the fiber forming conditions, particularly the temperature of the cones of glass suspended from the bushing tips in a continuous filament glass fiber process. It is also an object of the invention to provide controlled cooling of all of the cones of glass suspended from the bushing tips in a fiber forming process and to control the atmospheric conditions in the areas surrounding the cones. It is an object of the invention to provide uniform cooling of the cones of glass suspended from both the interior and the peripheral tips.

These and other objects of the invention are accomplished by withdrawing hot air from the zone of fiber attenuation through tubes located adjacent the bottom of the bushing, so as to withdraw the air from around the bushing tips and the cones of glass. They may also be accomplished by discharging a cooling gas beneath the bushing between some of the bushing tips while withdrawing hot air through tubes located beneath the bushing and between alternative rows of bushing tips. The manner of accomplishing the objectives of the invention is further described in conjunction with the accompanying drawing in which:

FIG. 1 is an elevation of a glass fiber forming process utilizing the present invention;

FIG. 2 is an elevation illustrating apparatus for stabilizing the fiber forming process;

FIG. 3 is a view in section taken along lines III—III of FIG. 2;

FIG. 4 is an enlarged elevation illustrating the placement of the discharge outlets in the apparatus shown in FIGS. 2 and 3; and FIG. 5 is a view similar to FIG. 4 showing a second embodiment of the invention.

In FIG. 1 of the drawing there is shown a glass melting furnace or forehearth thereof 10 containing a supply of molten glass 11 and having a bushing 13 attached to the bottom of the furnace. The bushing is made of a platinum-rhodium alloy containing approximately 90 percent platinum, and it is trough-like in shape. It is heated by electric current which is passed through terminals 14 connected to the ends of the bushing. The bottom face of the bushing is provided with a series of orifices with a hollow tip 15 extending downwardly at each orifice. The tips 15 are formed in a number of longitudinal rows, for example, 4 to 20 or more rows having 30 to 50 or more tips in each row so that the total number of tips is 200 or more in number. The tips in each longitudinal row are aligned with the tips in adjacent rows to form transverse rows which are usually arranged in pairs with the space between the pairs of rows being slightly larger than the space between the rows forming a pair of rows.

Glass filaments 19 are pulled from cones or streams of glass 20 which are suspended from each of the tips 15. These filaments are pulled at a very high rate of speed, i.e., 5,000 to 20,000 feet per minute, and wound on a rapidly rotating forming tube 22. The glass filaments are grouped into a strand 24 as they pass over a gathering guide 26 prior to their being wound on the forming tube 22. Usually a size made up of a liquid binder and lubricant such as a combination of starch and vegetable oil is applied to the filaments as they pass over a rotating roller 27 mounted in a container 28 holding a supply of the size. This is done prior to the time they are grouped into a strand 24. As the strand 24 is wound on the tube 22, it is rapidly traversed along the length of the tube by means of a suitable rotating traverse mechanism 30. In accordance with the present invention, an air withdrawal header 32 is mounted below the bushing 13 at about the same level as tips 15 and cones of glass 20. Hot gas withdrawn from the zone of attenuation adjacent the tips of glass is discharged to the atmosphere remote from the bushing 13 through a conduit 33. The header 32, shown more clearly in FIGS. 2 and 3, extends along the outside longitudinal row of tips a short distance from them and is provided with a series of apertures receiving relatively small hypodermic needles or tubes 36 which extend outwardly from the header at right angles in a horizontal plane. The tubes 36 project between the pairs of transverse rows of cones of glass 20. Each of these tubes 36 has small openings 38 in the walls, so that heated air surrounding the tips can be withdrawn through the tubes 36, through the header 32 for discharge through the conduit 33. The openings or holes 38 may be formed by drilling or by cutting rectangular slots or slits in the tube. The tubes extend completely across the underside of the bushing to a position beyond the farthest rows of tips and cones of glass. This insures that the heated air surrounding the tips is withdrawn through the tubes. The inside diameter of the tubes 36 may be, for example, on the order of 0.008 inch to 0.25 inch. The tubes may be flattened and have straight sides, so as to occupy less space between the rows of tips and cones.

The heated air withdrawn from the tubes 36 through the header 32 is discharged through the conduit 33 that is connected to an appropriate source of vacuum and has a valve 40 therein.

In FIG. 5 an alternative embodiment is illustrated in which alternate tubes 36 are connected to a header 32 of the type just described while the remaining tubes 36' are connected to a header 32' through which a cooling gas such as air, steam, nitrogen, carbon dioxide, sulfur dioxide or other gases suitable for cooling and for controlling the atmosphere for cooling surrounding the bushing tip area is introduced from a source such as a pump 42. Thus, in this embodiment a cooled gas is introduced in the attenuating zone between some of the rows of tips while the heated gases are withdrawn from the attenuating zone between others of the rows of tips.

I claim:
1. A method of forming thermoplastic fibers which comprises drawing a plurality of continuous filaments from molten streams of the thermoplastic material passing through orifices in the bottom of a bushing and applying a suction force less than the ambient air pressure adjacent the orifices to withdraw heated air away from the fibers in a direction transverse with respect to the path of movement of the fibers thereby increasing the cooling rate of the fibers.

2. A method for producing filaments of heat softenable material comprising, feeding a plurality of rows of streams of a molten form of said material from a feeder, attenuating said streams into fibers and applying a suction force less than the ambient air pressure between some rows of streams and within the zone of attenuation to withdraw heated air away from the fibers in a direction transverse with respect to the path of movement of the fibers and simultaneously introducing cooling gas into the zone of attenuation between other rows of streams.

3. A method for producing filaments of heat softenable material comprising feeding a plurality of rows of streams of a molten form of said material from a bushing, attenuating said streams into fibers, and applying a suction force less than the ambient gas pressure between adjacent rows of streams and within the zone of attenuation to withdraw other gas away from the fibers in a direction transverse with respect to the path of movement of the fibers.

4. In apparatus for producing filaments of heat softenable material which includes a heated bushing having a plurality of orifices therethrough for the passage of streams of said material to be attenuated into filaments, said orifices being arranged in rows, the improvement comprising, tubular means having openings therethrough located beneath said bushing and between some adjacent rows of orifices, and means connected to said tubular means for applying a suction force less than the ambient air pressure thereto so as to withdraw air from beneath said bushing and in a direction transverse with respect to the path of movement of the filaments.

5. Apparatus as recited in claim 4, further including means for introducing gas between other adjacent rows of orifices.

References Cited by the Examiner
UNITED STATES PATENTS

| | | | |
|---|---|---|---|
| 2,291,289 | 9/1942 | Slayter et al. | 65—12 |
| 2,300,736 | 11/1942 | Slayter et al. | 65—2 |
| 2,607,168 | 8/1945 | Drake | 65—204 |
| 3,150,946 | 9/1964 | Russell | 65—12 X |

DONALL H. SYLVESTER, *Primary Examiner.*